Oct. 18, 1966  R. R. BLAZEK ET AL  3,279,859
MOP MAKING MACHINE AND METHOD

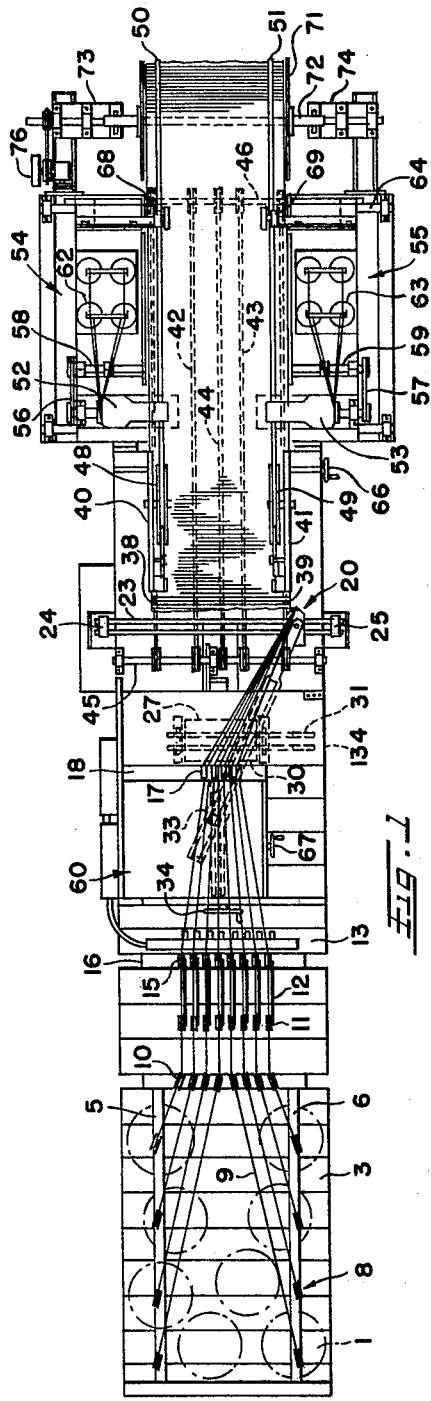
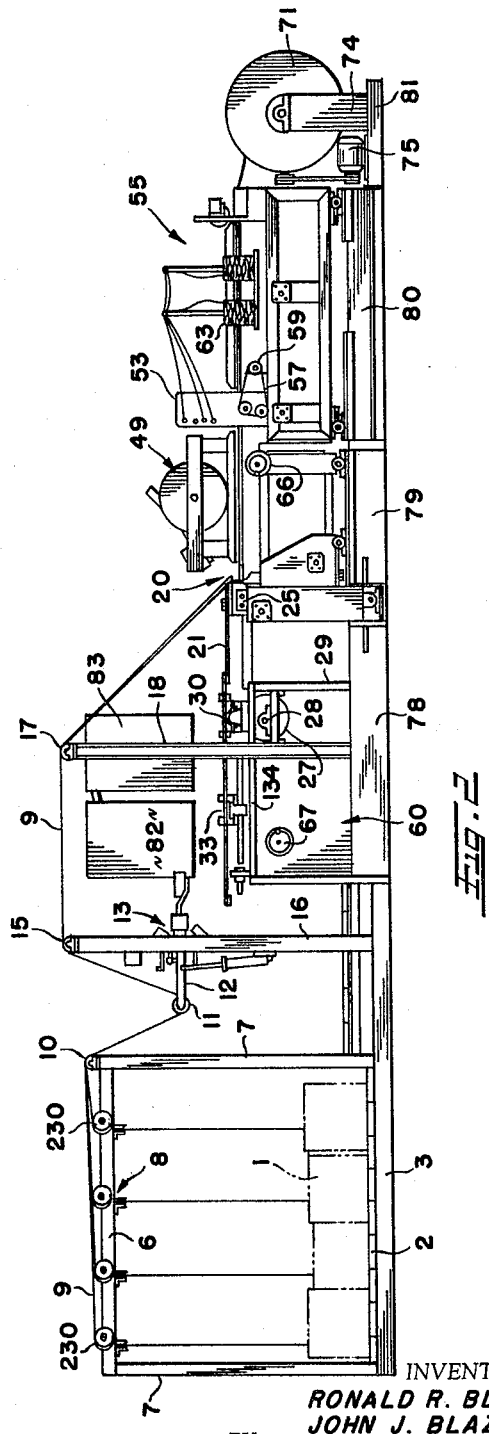

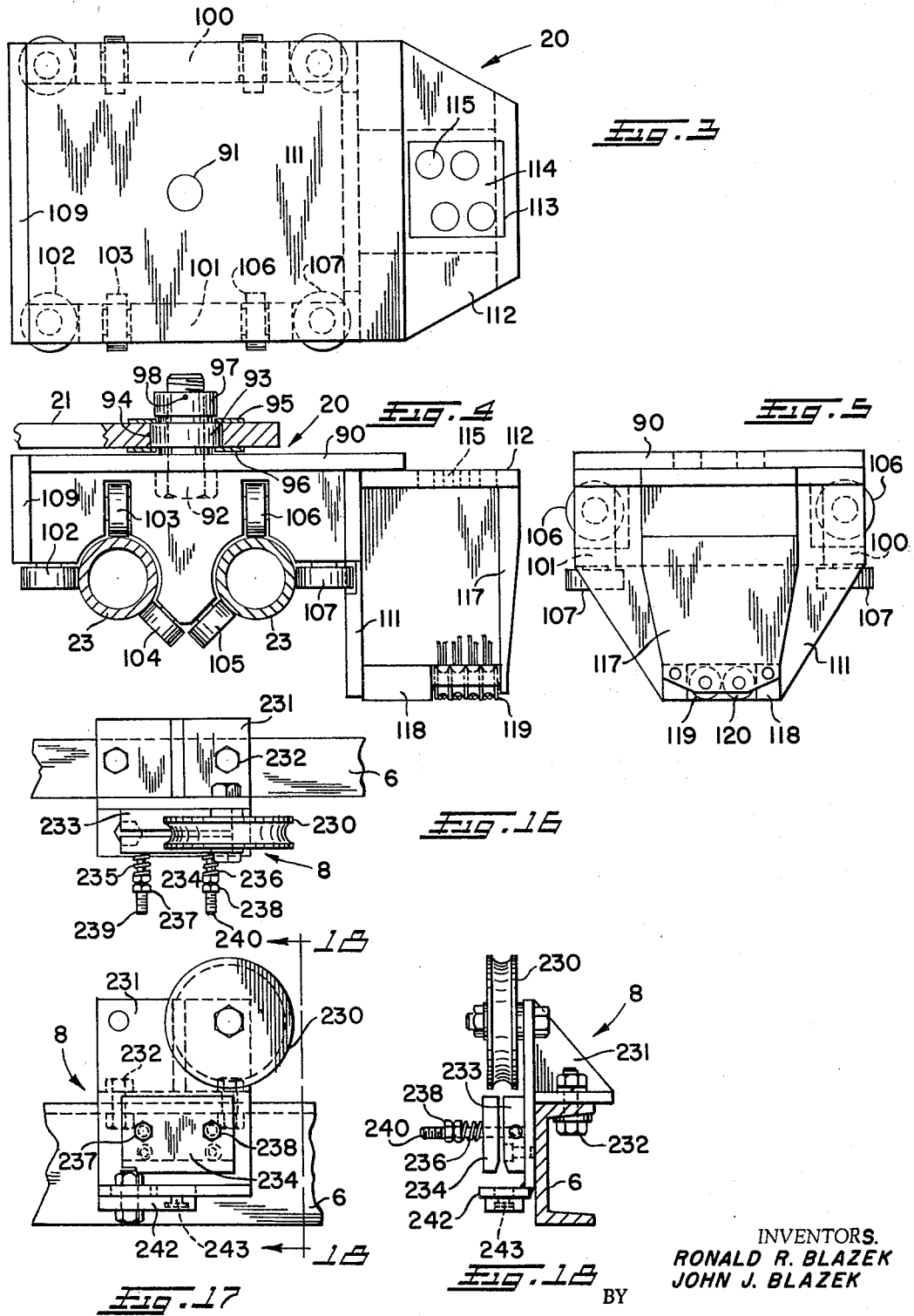

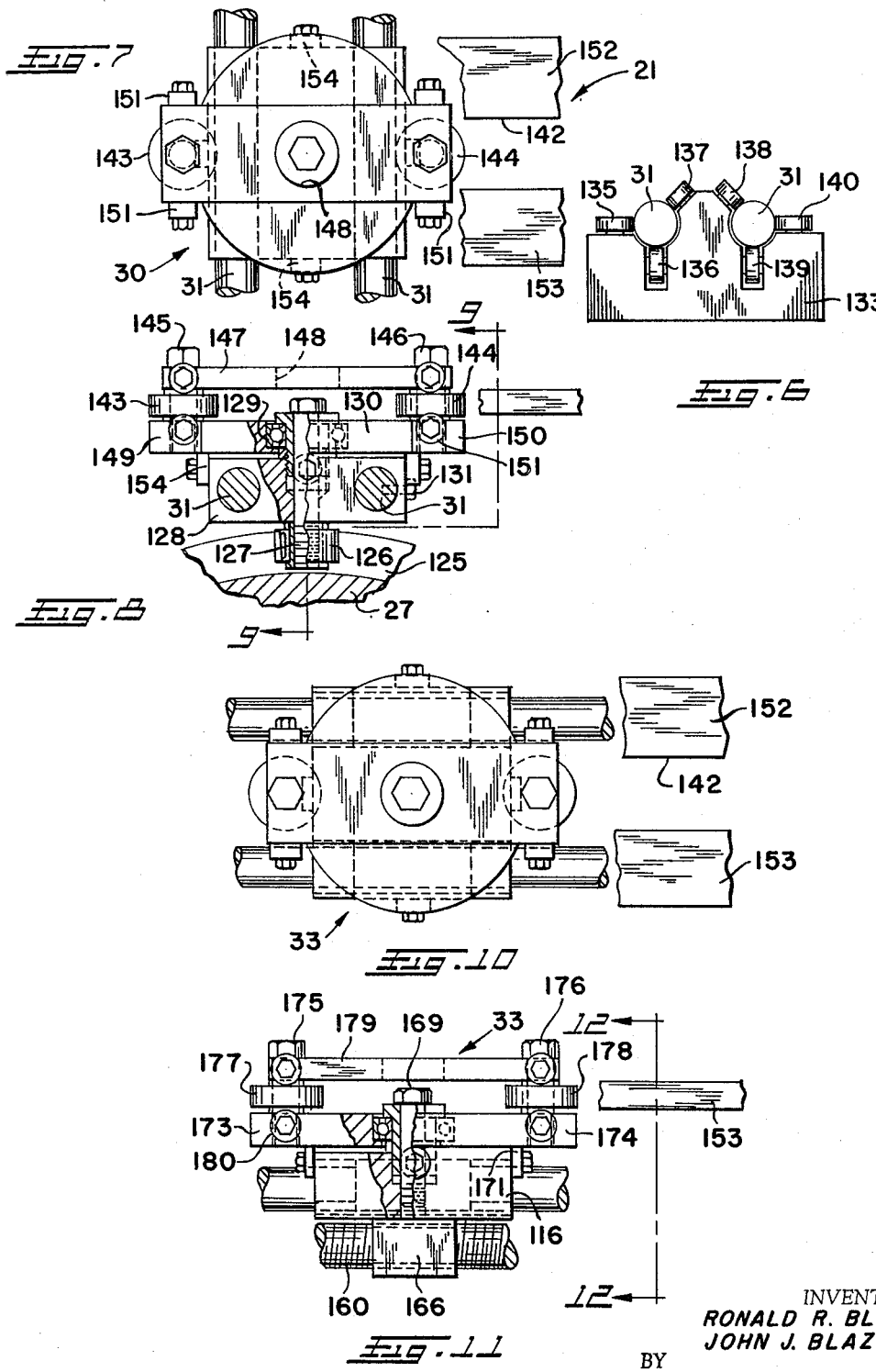

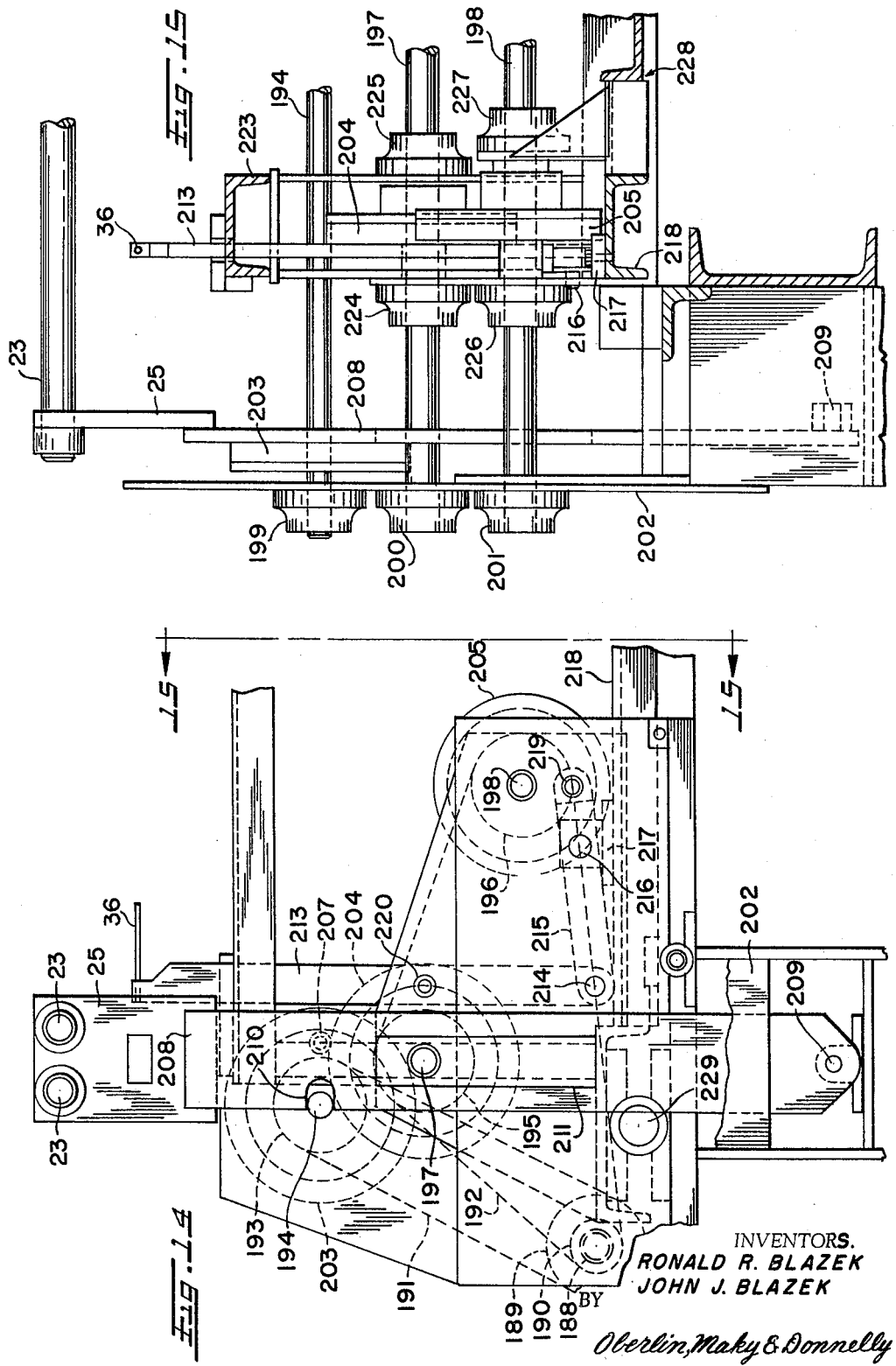

Filed May 28, 1964  6 Sheets-Sheet 5

INVENTORS.
RONALD R. BLAZEK
JOHN J. BLAZEK
BY
*Oberlin, Maky & Donnelly*
ATTORNEYS

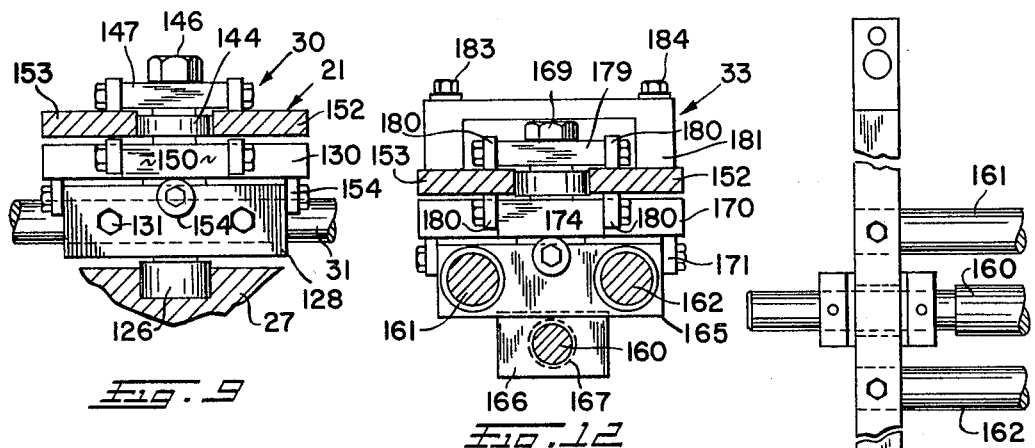

United States Patent Office 3,279,859
Patented Oct. 18, 1966

3,279,859
MOP MAKING MACHINE AND METHOD
Ronald R. Blazek and John J. Blazek, Cleveland, Ohio, assignors to Mr. Theron V. Moss, doing business as South Eastern Cordage, Cleveland, Ohio
Filed May 28, 1964, Ser. No. 370,945
20 Claims. (Cl. 300—16)

This invention relates generally as indicated to a mop making machine and method and more particularly to a machine and method for making continuously a mop swab of single strand thickness.

Heretofore, mop swabs of single yarn thickness have been produced in a satisfactory manner by withdrawing a large number of mop yarns from a supply and forming such into a single layer with the yarns parallel. Such mop manufacture is, however, characterized by intermittent tape application and severing which requires a substantial amount of manual labor in the handling, sewing and severing operations. Reference may be had to the copending application of Theron V. Moss, Serial No. 68,526, filed November 10, 1960, now Patent No. 3,115,658, entitled "Mop Construction" for a disclosure of one such form of mop manufacture.

It is accordingly a principal object of the present invention to provide a machine and method that will produce continuously a mop swab of single strand thickness.

It is another important object to provide a machine which will make continuously a mop swab of single strand thickness from a plurality of mop yarns.

Still another important object is the provision of a shuttle mechanism in such machine for laying a plurality of yarns in desired orientation to form a single yarn thickness swab.

It is another object to provide such shuttle mechanism which can be readily adjusted for desired swab width.

A still further object is the provision of a mop making machine which will be relatively maintenance free and in which broken yarns can easily be corrected.

Yet another object is the provision of a mop making machine which will have a controlled yarn tension and produce little or no wasted yarn.

A further object is the provision of a mop making machine which will occupy but a small space and which can readily be adjusted to produce mop swabs of different size.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a top plan view of a mop making machine in accordance with the present invention;

FIG. 2 is a side elevation of such machine;

FIG. 3 is a top plan view on an enlarged scale of the reciprocating shuttle mechanism;

FIG. 4 is a side elevation of such shuttle mechanism;

FIG. 5 is a front elevation of the shuttle mechanism as seen from the right in FIGS. 3 and 4;

FIG. 6 is an end elevation on a somewhat reduced scale of the brackets supporting the shuttle actuating pivot support rods at each end thereof;

FIG. 7 is a top plan view of such shuttle actuating pivot;

FIG. 8 is an end elevation partly broken away and in section of such shuttle actuating pivot;

FIG. 9 is a fragmentary vertical section of such shuttle actuating pivot taken from the line 9—9 of FIG. 8;

FIG. 10 is a fragmentary top plan view of the shuttle adjusting pivot;

FIG. 11 is an end elevation partially broken away and in section of such shuttle adjusting pivot;

FIG. 12 is a vertical section of such adjusting pivot taken on the line 12—12 of FIG. 11;

FIG. 13 is a fragmentary top plan view of the bracket mounting the support rods and adjusting screw for such shuttle adjusting pivot;

FIG. 14 is an enlarged fragmentary side elevation of the shuttle indexing mechanism and the picker pin translating mechanism;

FIG. 15 is a vertical section taken substantially on the line 15—15 of FIG. 14;

FIG. 16 is an enlarged top plan view of one of the yarn guide pulleys and brake mechanisms employed in conjunction with the feeding of the yarns to the shuttle;

FIG. 17 is a fragmentary side elevation of the mechanism illustrated in FIG. 16;

FIG. 18 is a vertical section of such mechanism taken substantially on the line 18—18 of FIG. 17;

FIGS. 21 through 25 are diagrammatic illustrations of the successive steps in the translation of the picker pin and the indexing of the shuttle.

MACHINE—GENERAL ARRANGEMENT

Figure 19:
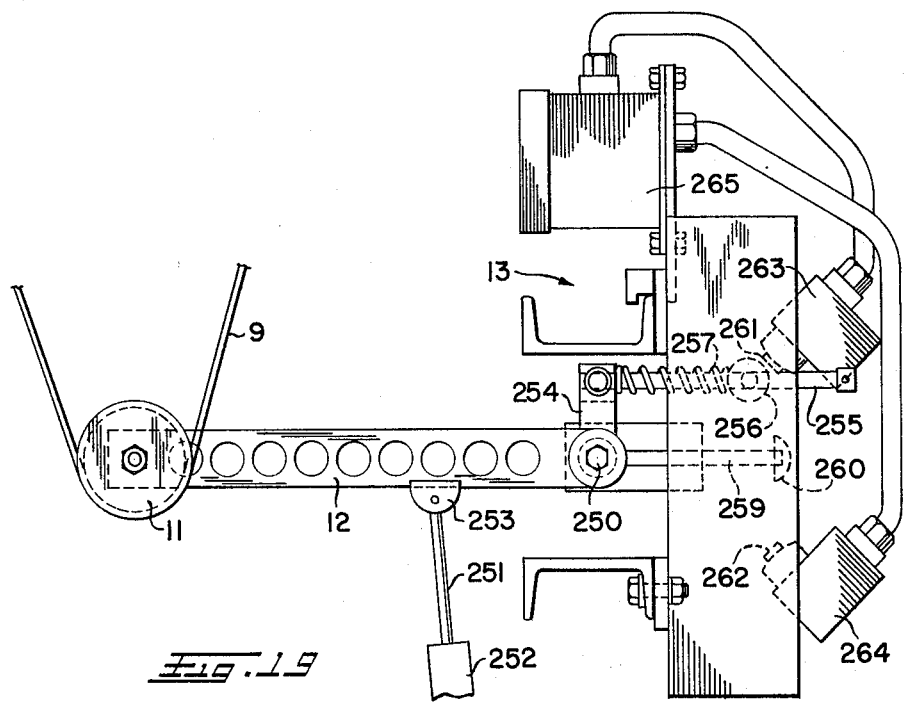
FIG. 19 is an enlarged side elevation of the yarn tension control mechanism of the present invention.

Referring first to FIGS. 1 and 2, a plurality of yarn cones 1, shown as eight in number, are mounted on upright projections 2 on wooden deck or frame 3 at one end of the machine. An overhead frame comprised of longitudinal members 5 an 6 supported on legs 7 supports yarn pulley and brake units 8 for the respective yarn cones 1. Such units 8, illustrated in detail in FIGS. 16 through 18, function to maintain an even tension on the yarn when the shuttle, hereinafter described, traverses. Such units also maintain an even length of yarn between the picker pins, also hereinafter described. From the units 8, the yarn strands 9 from the respective cones pass over respective yarn guide pulleys 10 and then down about pulleys 11 mounted on arms 12 for each of the yarn strands. Movement of the arms 12 occasioned by a yarn break or a yarn snag will actuate an interlock unit shown generally at 13 which will momentarily stop the machine until such snag or break is corrected. The pulleys 11, arms 12 and units 13 are illustrated in more detail in FIG. 19.

From the arm supported pulleys 11, the yarn strands 9 pass over yarn guide pulleys 15 mounted on stand 16 and then horizontally to guide pulleys 17 mounted on stand 18, such latter guide pulleys being spaced much closer together than the guide pulleys 15.

From the pulleys 17, the yarns 9, now fairly closely spaced, pass downwardly into shuttle head 20 mounted on the end of shuttle actuating arm 21. The shuttle head 20 is mounted for reciprocation on parallel guide rods 23 which are supported at each end by upstanding traversing brackets or arms 24 and 25. Movement of the shutle head back and forth along the guide rods 23 is obtained by means of a grooved cylindrical cam 27, journalled at 28 in stand 29 directly beneath the horizontally disposed arm 21. A cam follower pivot mounted on laterally movable rods 31 on which the arm 21 is slidably movable causes the arm to oscillate back and forth moving the shuttle head 20 back and forth along the support rods 23. A stroke adjusting pivot 33 which may be adjusted longitudinally of the machine by a screw mechanism operated by hand wheel 34 constitutes the adjustable proximal pivot of the arm and such arm is also freely slidably movable with repsect to such adjusting pivot.

As the shuttle head is thus caused to traverse the machine on the support rods 23, yarn passing through the shuttle head is caught at each side of the shuttle travel by picker pins 36 positioned at each side of the machine which are illustrated in detail in FIGS. 14, 15 and 21 through 25 which cause the yarn to be pulled down into mesh with outwardly projecting pins 37 on parallel chain conveyors 38 and 39. The shutle indexes to the left by movement of the rod support brackets 24 and 25 and continues its normal recirpocating movement occasioned by the cylindrical cam 27. The top flights of the conveyors 38 and 39 upon which the yarn is thus deposited move to the right as seen in FIGS. 1 and 2 and the yarn is thus pulled off the picker pins and moved beneath conveyor clamps 40 and 41 which maintain the yarn in engagement with the conveyor pins. The needles or pins 37 projecting from the conveyor chains 38 and 39 not only move the layer of mop yarns laid upon the chains by the shuttle to the right from the shutle, but also maintain an even distribution of the yarns as the swab moves. Two central belts or chains 42 and 43 may also be employed to support the yarns as they move to the right. A drive chain 44 interconnects shafts 45 and 46 which are parallel to each other and each provided with sprockets about which the endless conveyor units 38, 39, 42, 43 and 44 are trained.

Tape dispensing spool units 48 and 49 are provided adjacent the edges of the transversely extending contiguous parallel mop yarns thus produced by the shuttle head and the needle conveyor chains to supply tapes 50 and 51 to sewing machine heads 52 and 53. The sewing machine heads 52 and 53 form part of sewing machine units 54 and 55, respectively. The sewing machine heads may be driven by belts 56 and 57 from jack shafts 58 and 59, respectively, which in turn are driven from a sewing machine power transfer unit mounted directly beneath the needle conveyor which in turn is driven by a sewing machine line shaft from a power unit which may be indicated generally at 60. Such main power unit at 60 not only includes a main drive motor but also a speed adjustment unit and a reduction gear box. Such main power unit will also drive the shafts 45 and 46 of the conveyors, the cylinder cam 27, and the operating cams for the indexing of the shuttle and the rectilinear translational movement of the picker pins.

The sewing machine units 54 and 55 also include thread supply units 62 and 63 mounted on the supporting frames thereof which in turn are mounted on transversely extending support shafts indicated at 64 whereby such units may be removed from the line or moved toward and away from each other to accommodate different width mop swabs produced. The width of the sewing heads as well as the width of the pin or needle conveyor may readily be adjusted to change the width of the mop swabs produced by means of the hand wheel 66 and an associated scale. The hand wheel not only changes the width of the conveyor, but also the tape holder units 48 and 49, and the sewing machines and the associated parts. However, the adjustment of the shuttle mechanism is separate, being accomplished by the hand wheel 34 which moves the pivot 33 longitudinally of the machine as hereinafter described to change the stroke length of the shuttle. The control handle 67 may be employed to control the speed of the shuttle by varying the strokes per minute.

Adjacent the end of the pin or needle conveyors and mounted for lateral adjustment on the sewing machine units are a pair of pinch roll-cam units 68 and 69 through which the now tape-stitch connected swab passes to be lifted and cleared from the conveyor pins or needles 37 as they move about the respective sprockets on the shaft 46. A trimming unit, not shown, may be incorporated adjacent the pinch roll units to trim the looped ends of the yarn beyond the now sewn tapes. As the swab leaves the conveyor, it is wound on a spool 71, the arbor 72 of which is mounted on stands 73 and 74 so that full and empty spools may readily be removed and placed in the machine. The winder spool is driven by a drive motor 75 through a magnetic slip drive unit 76 which is operative to maintain a tension on the swab produced at all points of winder fullness. It is noted that the shuttle drive mechanism, the shuttle index and picker pin translating mechanism, the sewing machine units and the winder may be mounted on separate base or frame structures 78, 79, 80 and 81, respectively, so that they may be removed from the machine line. Control panels 82 and 83 may be provided containing the power relays and interlocks as well as various switches and signal lights for the completely automatic operation of the machine.

Various counters may be provided to log the production of the machine and when the mop swab is removed upon the winder spool, the swab wound upon the spool may then be severed transversely of the machine or parallel to the lie of the yarns and the individual swabs produced may be bunched in the middle and wrapped with a binding tape to produce mop swabs of the type shown in the aforementioned patent of Thereon V. Moss.

SHUTTLE HEAD (FIGS. 3, 4 AND 5)

The shuttle head 20 comprises a top plate 90 having a central aperture 91 therein accommodating stud 92 which projects through a ball bearing unit 93 mounted in aperture 94 in the distal end of the shuttle arm 21. Lock rings 95 and 96 confine the arm with respect to the bearing and a collar 97 may be held to the stud by a cotter pin or like fastener 98. Roller mounting blocks 100 and 101 depend from each side of the top plate 90 and each are provided with six rollers 102 through 107 arranged as indicated in FIG. 4 to confine the tubular guide rods 23 and support the shuttle head thereon for shuttling movement therealong. The rollers 102 and 107 lie in a horizontal plane and the rollers 103 and 106 lie in vertical planes, such planes passing through the axes of the guide members 23. The rollers 104 and 105, which may be removed to take the shuttle head off the guide members lie in planes extending at approximately 45° to the horizontal and vertical planes passing through the axis of the guides. The rear of the shuttle head is closed by a plate 109 secured to the plate 90 and bridging the roller blocks 100 and 101. The front of the shuttle head is provided with a depending plate 111 which is provided with clearances for the rollers 107 and a horizontal plate 112 extends from the vertical plate 111 beneath the front edge of the top plate 90 and such plate has a rectangular aperture 113 therein for a carbide insert 114 having four holes 115 therein arranged in the offset manner more clearly indicated in FIG. 3. The front edge of the plate 112 has a depending plate 117 secured thereto and a roller support block 118 extends between the bottoms of the plates 111 and 117. Such block 118 is cut away and has journalled therein parallel side-by-side grooved rollers 119 and 120, the bottom of the rollers are thus exposed beneath the cut away portion of the block 118.

Of the eight yarn strands passing into the shuttle head, two each will pass through the respective apertures 115 in the carbide insert 114 and thus paired will then pass around the four axially spaced grooves in the rollers 119 and 120 depending upon the direction of travel of the shuttle. If the shuttle head is moving to the right as seen in FIG. 5, the strands will then pass about the grooves in the rollers 119 to be deposited on the pin conveyor. Conversely, if the shuttle head is moving to the left, the strands will then pass about the grooves in the roller 120. The strands are then paired for depositing on the pin conveyor in a single layer. This construction of the shuttle head permits the correction of a broken yarn quite readily in that one strand of any particular pair may readily be tied to the other strand so that both may then pass through the correct aperture and around the proper groove in the rollers 119 and 120. This, of course, also facilitates the replacement of the yarn cones and the initial setup of the machine.

SHUTTLE OPERATING MECHANISM (FIGS. 6 THROUGH 13)

The operating pivot 30 for the shuttle arm 21 is illustrated more clearly in FIGS. 6, 7, 8 and 9, while the adjusting pivot is shown more clearly in FIGS. 10, 11, 12 and 13. The operating pivot 30 of the shuttle arm 21 is shifted back and forth by means of the cylinder cam 27 and groove 125 therein in which is situated follower 126. Such follower may be mounted by means of suitable bearings on a stud 127 projecting upwardly into pivot block 128 and further upwardly into bearing 129 in pivot plate 130. The pivot block 128 is provided with two transversely extending apertures which accommodate therein operating pivot support rods 31 and which may be held fixedly therein by suitable set screws or like fasteners 131.

As seen also in FIG. 1 as well as more particularly in FIG. 6, the support rods 31 are supported on blocks 133 on platform 134 at each side of the cylinder cam 27. Such blocks rotatably support rollers 135 through 140 which support and confine the rods 31 for reciprocatory movement transversely of the machine. The block 133 is substantially similar to the blocks 100 and 101 of the shuttle mechanism only inverted. The rollers 135 and 140 are in horizontal planes while the rollers 136 and 139 are in vertical planes with the rollers 137 and 138 inclined, the planes of all such rollers passing through the respective axes of the support rods. Again the rollers 137 and 138 may be removed to lift the rods from the support blocks. Thus the operating pivot 30 is free to reciprocate transversely of the machine.

The shuttle arm 21 at this point is provided with a center slot 142 which accommodates rollers 143 and 144 which are mounted on suitable bearings on studs 145 and 146 projecting upwardly from the pivot plate 130. A top plate or strap 147 interconnects the studs 145 and 146 above the horizontal rollers 143 and 144 and is provided with a central aperture 148 permitting access to the top of stud 127. Mounted on the top plate 147 and the projecting ends 149 and 150 of the pivot plate 130 are somewhat smaller rollers 151 mounted for rotation in vertical planes which confine top and bottom the two portions 152 and 153 of the shuttle arm 21 provided by the center slot 142. While the pivot block 128 is not free to pivot about the center or pivot stud 127, the pivot plate 130 is and accordingly peripheral supporting rollers 154 are mounted on the respective sides of the block underlying the periphery of the pivot plate 130 supporting the same for rotation about the center axis or stud 127 and taking some of the load from the bearing 129.

Accordingly, the shuttle arm 21 will be oscillated back and forth by means of the cylinder cam 27 and the shuttle arm will be free to slide longitudinally with respect to the pivot 30. The distal end of the arm being fixed on the guide rods 23, the shuttle arm will then slide back and forth at the pivot 30 as the shuttle moves from side to side.

The adjusting pivot 33 comprises a similar structure as illustrated in FIGS. 10, 11, 12 and 13, but such pivot is fixed both transversely and longitudinally of the machine, however being adjustable longitudinally of the machine by means of hand wheel 34 operating adjusting screw 160. The adjusting screw as well as guide rods 161 and 162 may be mounted on platform 134 by means of the brackets 163 illustrated in FIG. 13. The pivot block 165 which accommodates in parallel through bores therein the guide rods 161 and 162 is provided with a central depending hub 166 secured thereto which includes a tapped opening 167 into which the screw shaft 160 is threaded. Accordingly, rotation of the screw shaft will cause the pivot block 165 to move along the guide rods 161 and 162. A suitable scale may be provided adjacent the block 165 so that the operator can accurately determine the position thereof and thus the length of the stroke of the shuttle head.

A pivot stud 169 projects upwardly from the pivot block 165 and supports for pivoting movement thereon a pivot plate 170 which may also be supported by rollers 171 on the faces of the block 165 engaging the underside of the plate 170. The pivot plate 170 is provided with rectangular diametrically opposite projections 173 and 174 vertically from which extend studs 175 and 176 having journalled thereon horizontal rollers 177 and 178 and connected thereabove by plate 179. The plate 179 and the projections 173 and 174 are provided with smaller rollers 180 which straddle top and bottom the two portions 152 and 153 of the shuttle arm 21. The horizontally disposed rollers 177 and 178 fit within the slot 142 in the shuttle arm so that the shuttle arm is thus confined against lateral movement and top and bottom by the smaller rolls 180. To rigidify the shuttle arm, the two portions 153 and 152 thereof may be connected by a bridge 181 as indicated in FIG. 12 held to the respective portions by fasteners 183 and 184.

It will accordingly now readily be seen that the transverse length of the movement of the shuttle can easily be adjusted by the hand wheel 34 turning the screw 160 to move the adjusting pivot 33 longitudinally of the machine. As the pivot 33 moves to the right as seen in FIG. 1, the stroke of the shuttle head 20 must necessarily increase. Conversely, if the shuttle adjusting pivot 33 is moved to the left, as seen in FIG. 1, the stroke of the shuttle head will decrease. The pivot 33 acts as a fulcrum with the force required to oscillate the shuttle arm being provided by the operating pivot 30 from the cylinder cam 27.

SHUTTLE TRANSLATING AND PICKER PIN OPERATING MECHANISM (FIGS. 14 AND 15)

A jack shaft 188 driven from the main power unit indicated at 60 is provided with sprockets 189 and 190 of different size. Sprocket chains 191 and 192 are trained about such sprockets, the sprocket 191 also being trained about sprocket 193 on shaft 194, and the chain 192 being trained about sprockets 195 and 196 on shafts 197 and and 198 respectively. Such shafts may be journalled at 199, 200 and 201 in outside support plate 202, shown broken away in FIG. 14, and serve to drive groove type positive plate cams 203, 204 and 205, respectively. The groove in plate cam 203 engages follower 207 mounted on vertically elongated arm 208 supporting shuttle guide rod bracket 25, such arm being pivoted at 209 at the bottom thereof. Such arm 208 may be provided with a slot 210 accommodating the shaft 194 and a vertically elongated slot 211 accommodating the shaft 197. The cam 203 will then cause the arm 208 to oscillate in a controlled manner thus shifting the shuttle head supports 23 to index the same for proper depositing of the yarn strands on the pin conveyor.

The picker pin 36 is mounted on a vertically extending arm 213 pivoted at 214 at its lower end to one end of arm 215 which is intermediately pivotally mounted at 216 on bracket 217 in turn mounted on inverted channel frame member 218. The opposite end of the arm 215 is provided with follower 219 engaging within the groove of the plate cam 205. The arm 213 is also provided with a follower 220 engaging within the groove of the plate cam 204. It is now believed apparent that the cam 205 will cause the arm 215 to oscillate about its intermediate pivot 216 raising and lowering the arm 213. The cam 204, however, engaging the follower 220 will cause the arm 213 to oscillate back and forth concurrently about its bottom pivot 214. Thus horizontal movement of the picker pin 36 is obtained by the cam 204 while vertical movement of such pin is obtained by the cam 205.

While the arm 208 supporting the bracket 25 in turn supporting the shuttle head guides 23 may be fixed transversely of the machine, the mechanism driving the picker pin 36 is preferably adjustable transversely of the machine, and accordingly the supporting frame therefor 223 and the journals 224, 225, 226 and 227 mounted on the sub-frame 228 for the shafts 197 and 198 may be adjusted transversely of the machine by adjusting screw 229 with the conveyor adjustment obtained by hand wheel 66 shown in FIG. 1. It will be understood that the mechanism illustrated in FIGS. 14 and 15 will be duplicated at each side of the conveyor supporting the shuttle head for its advance and rear indexing movement and the picker pin for its vertical and horizontal rectilinear movement hereinafter described.

YARN SUPPLY (FIGS. 1, 2 AND 16 THROUGH 19)

It will be appreciated that the movement of the shuttle head 20 will cause the yarn to be drawn from the various supply cones intermittently and at a variable rate. As the shuttle moves through its stroke, it will accelerate from 0 velocity to a maximum velocity and then decelerate to a stop at the opposite end of the stroke. During such stroke movement, with the yarns caught in the pins of the conveyor, the individual yarn strands will be pulled from the supply cones 1. From the cone, the yarn strands will pass through the drag brake units shown in detail in FIGS. 16 through 18. Such units 8 each include a sheave 230 rotatably mounted on bracket 231 held by suitable fasteners 232 to the channel frame member 6. Such bracket 231 also supports a drag brake unit comprising a fixed brake shoe 233 and an outer spring loaded brake shoe 234. The pressure of the spring loaded brake shoe is obtained by springs 235 and 236 which may be adjusted by nuts 237 and 238, respectively, on threaded studs 239 and 240 projecting therethrough. The bottom of the bracket 231 is provided with a plate 242 having an eye 243 therein through which the yarn strand 9 will extend from the cone through the brake shoes and over the sheave 230 to pass then over the guide sheaves 10 to the yarn break and snag detectors. The drag brake units thus provided maintain proper tension on the yarn from the sheaves 230 to the shuttle head 20 for proper operation of the units illustrated more clearly in FIG. 19.

From the guide pulleys 10, yarn strands 9 pass downwardly about the sheaves 11 mounted on the distal ends of arms 12, the proximal ends being pivoted at 250. The arms are supported in their substantially horizontal positions by the rods 251 of dashpot units 252 which are secured to brackets 253 on the underside of each arm. Each arm includes an offset portion 254 and a rod 255 projecting therefrom through pivot 256 with a compression spring 257 being mounted on such rod between the arm extension 254 and the pivot 256. The inner end of the arm 12 is provided with a projection 259 having a microswitch actuator 260 on the end thereof arranged to engage buttons 261 and 262 of microswitches 263 and 264, respectively. It can now be seen that should the yarn 9 wrapped about the sheave 11 become snagged or the tension thereon increase beyond a predetermined norm, the arm 12 will be elevated causing the microswitch actuator 260 to pivot downwardly to engage the button 262 of the switch 264. Conversely, should the yarn 9 break, the weight of the arm 12 will cause the microswitch actuator 260 to pivot upwardly engaging the button 261 of the microswitch 263. Such switches are electrically connected to the junction box 265 which in turn is connected to the control panels 82 and 83 so that a signal light will be actuated and an interlock tripped to stop the operation of the machine. The operator may then readily adjust a particular yarn should a snag have occurred or simply tie a broken yarn to its adjacent yarn should a yarn break have occurred. With the yarn break or snag corrected, the machine operation will then continue. From the guide sheaves 15, the yarns 9 will pass horizontally over the sheaves 17 and in a paired manner down into the apertures 115 in the carbide insert of the shuttle head and from there about the grooved rollers 119 and 120 to be deposited on the pin conveyor.

TAPE APPLICATION (FIG. 20)

Figure 20:
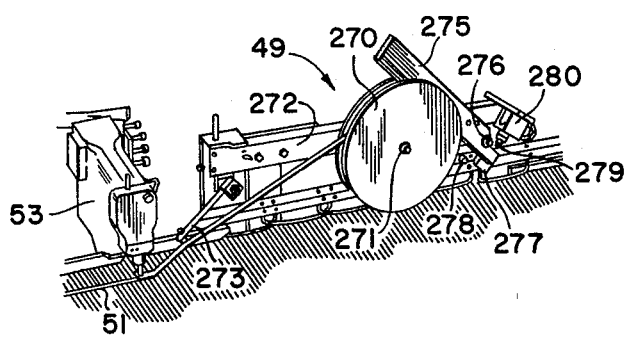
FIG. 20 is a perspective view illustrating the tape feed and sewing mechanism which may be employed with the machine.

The tape 51 may be drawn from spool 270 which is mounted at 271 on the frame 272 of the tape dispensing unit 49. The tape passes from the spool 270 through a tape guide 273 which holds the tape out of engagement with the mop yarns laid upon the pin conveyor until it passes beneath the sewing head 53. In order to maintain the tape under tension from the spool 270 to the sewing head 53, a brake arm 275 is provided pivoted at 276 which fits between the end walls of the spool and bears frictionally upon the tape coiled therein. The arm 275 is provided with a lateral extension 277 near the pivot 276 thereof which is adapted to engage microswitch button 278 which operates an interlock preventing operation of the machine when the switch button is engaged. Button 279 of microswitch 280 is adapted to engage the arm when the arm pivots to the left as seen in FIG. 20 a predetermined amount indicating that the spool 270 is substantially empty. A signal light will then warn the operator that the spool should shortly be replaced. The operator may then raise the arm 275 which will depress the switch button 278 stopping the machine and the spool may then be changed. The arm 275 must again be placed in frictional engagement with the outer periphery of the tape coil releasing the button 278 before the machine will again operate.

In the illustrated machine, only one lock stitch sewing machine is employed on each side to sew the tapes 50 and 51 to the single layer of mop swab yarns deposited on the pin conveyor. It will be appreciated that more than one sewing machine may be employed on each side of the machine and that additional tapes may be sewn longitudinally of the swab produced. Also, either a chain or lock stitch may be employed to secure the tapes to the layer of mop yarns.

OPERATION (FIGS. 1, 2 AND 21 THROUGH 26)

The general operation of the machine is believed apparent when viewing FIGS. 1 and 2 in that the yarn strands 9 will pass through the brake units 8, through the snag and break detector units 13, over the guide sheaves 15 and 17 and then through the four holes 115 in the shuttle head 20 to be deposited as the shuttle head moves back and forth transversely of the machine in a flat layer eight strands wide on the pin conveyor 38, 39. The tapes 50 and 51 will be sewn thereto by the machines 52 and 53 and the continuous swab thus produced will be lifted from the pin conveyor to be wound on the take-up spool 71.

The sequential operation of the shuttle head and the picker pin with respect to the pin conveyor is illustrated more clearly in FIGS. 21 through 25. As seen in FIG. 21, the shuttle head 20 is moving toward the viewer stringing a flat layer of contiguous mop yarns eight yarns wide across the pin conveyor, the yarns 9 being caught by the pins 37 of the conveyor chain 39 and the shuttle head 20 moving to the right with the conveyor 39 in the direction of the arrow 282 in synchronism therewith, such shuttle head movement being caused by the cam 203 pivoting the arms 208 to the right as seen in FIG. 14.

In the meantime, as seen in FIGS. 22 and 23, the picker pin 36 at the side of the machine to which the shuttle head 20 is moving will be caused to move rearwardly along the path 283 by the cam 204 and then upwardly along the path 285 by cam 205 and in FIG. 23 then forwardly along the pass 286 also by the cam 204. In the position of the pin 36 obtained in FIG. 23, it will now be above the eight strand layer of yarns 9 as the shuttle head moves to the end of its stroke.

As seen in FIG. 24, with the stroke of the shuttle head completed, the pin 36 now moves downwardly at the direction of cam 205 to draw the strands from the shuttle head down into engagement with the pins 37 of the conveyor 39. When this is accomplished, the shuttle head 20 is caused to index rearwardly as seen in FIG. 25 by the cam 203. With the picker pin still in engagement with the yarns 9, the shuttle head 20 will now start to traverse back across the conveyor laying the next eight strand layer of yarn immediately adjacent and to the rear of the eight width layer just completed. During the traversing of the shuttle head, the cam 203 will cause the same to move with the conveyor in the direction of the arrow 282 to maintain the yarns contiguous to each other to form a single layer swab with all of the yarns therein closely spaced. Movement of the conveyor to the right will pull the looped portions of the yarn strands from the picker pin and the parts will then return to their FIG. 21 position. When the shuttle head reaches the opposite side of the conveyor, the same sequential procedure will be followed with the rectilinear movement of the picker pin drawing the yarns down into engagement with the pins 37 of conveyor 38.

PROCESS

It can now be seen that a mop swab of a single yarn thickness is produced with the yarns oriented parallel to each other and closely spaced by grouping a plurality of yarns into a flat layer one strand in thickness and depositing such groups on a moving support by anchoring such layer at one side of the support which is moving in a plane parallel to the thus grouped layer. The flat group of yarn is then laid across the support and anchored at the opposite side thereof. The support and layer are then indexed relative to each other and the flat group of yarns is then laid back across the support in the opposite direction adjacent to the layer now anchored at each end to the support. A tape or other elongated element is then laid across the contiguous groups of flat layers of yarn and secured thereto to produce a continuous swab.

It will now be seen that there is provided a machine and method which will make continuously a mop swab of single strand thickness from a plurality of mop yarns. While the illustrated machine shows eight yarns being combined into a flat group to produce the continuous swab, it will readily be appreciated that more or less yarns may be employed. With such machine, a broken yarn or a yarn snag can easily be detected and corrected and the yarn strands will be laid on the moving support at the proper tension. In this manner, little or no wasted yarn will be provided and a continuous swab of uniform quality will be produced. Such machine incorporates a unique shuttle mechanism for laying the yarns in desired orientation to form such single yarn thickness swab and such can readily be adjusted for desired swab width.

Other modes of applying the principle of the invention may be employed, change being made as regards the details described, provided the features stated in any of the following claims or the equivalent of such be employed.

We, therefore, particularly point out and distinctly claim as our invention:

1. A mop making machine comprising a source of a plurality of mop yarns, shuttle head means operative to group such yarns in a flat layer of contiguous yarns having a single yarn thickness, a moving conveyor having outwardly projecting pins at each side thereof, support means extending transversely of said conveyor for said shuttle head, means operative to move said shuttle head back and forth along said support means adjacent said conveyor, and picker pin means at each side of said conveyor operative to engage such layer of yarns and pull the same from said shuttle head into engagement with the pins at each side of the conveyor to anchor such layer to the conveyor at the end of each stroke of the shuttle head, and cam means operative to move said picker pins in a rectangular path in timed relation to the movement of said shuttle head.

2. A mop making machine as set forth in claim 1 including means operative to index the support means for said shuttle head rearwardly at the completion of each stroke thereof, and to move the same forwardly with the conveyor during each stroke thereof.

3. A mop making machine as set forth in claim 2 including a shuttle head operating arm, means pivoting said arm to said shuttle head, an operating pivot connected to said arm and driven by a cam operative to oscillate said arm thus to move said shuttle head back and forth along said support means, and an adjusting pivot on said arm movable along the stroke bisecting axis of said arm operative to control the extent of the stroke of said shuttle head.

4. A mop making machine as set forth in claim 3 including vertically extending arms supporting said picker pins, the lower ends of said arms being mounted on rocker arms, first cam means engaging the opposite end of said rocker arms operative to raise and lower said picker pins, and second cam means engaging said picker pin supporting arms operative to move said picker pin horizontally 5. A mop making machine comprising a source of a plurality of mop yarns, means operative to group such yarns in a flat layer of contiguous yarns having a single yarn thickness, a moving support parallel to such layer, means operative to anchor such layer at one side of said moving support, means operative to lay such layer across said moving support, means operative to anchor such layer at the opposite side of said support, means operative then to lay such layer back across said support anchoring such layer at said one side of said support, thus to form a continuous flat layer of contiguous yarns having a single yarn thickness, means operative to secure such yarns together in such continuous flat layer, means to control the tension of each yarn, and means responsive to a broken or snagged yarn operative to halt operation of the machine.

6. A mop making machine as set forth in claim 5 including means to remove such continuous flat layer of yarns from said moving support and wind such layer on a spool for storage purposes.

7. A mop making machine as set forth in claim 5 wherein said means to secure such yarns together in such continuous flat layer comprises a tape extending transversely of such yarns, and means to secure said tape to such yarns.

8. A mop making machine as set forth in claim 5 wherein said moving support comprises a conveyor with outwardly projecting pins at each side thereof, and means at each side of said conveyor operative to engage such flat layer of contiguous yarns and pull the same into anchoring engagement with said pins.

9. A mop making machine comprising a source of a plurality of mop yarns, means operative to group such yarns in a flat layer of contiguous yarns having a single yarn thickness, a moving support parallel to such layer, means operative to anchor such layer at one side of said moving support, a shuttle head operative to lay such layer across said moving support, means mounting said shuttle head for movement transversely of said moving support, means also mounting said shuttle head for indexing movement relative to said moving support, means operative to anchor such layer at the opposite side of said support, means operative then to lay such layer back across said support anchoring such layer at said one side of said support thus to form a continuous flat layer of contiguous yarns having a single yarn in thickness and means operative to secure such yarns together in such continuous flat layer.

10. A mop making machine comprising a source of a plurality of mop yarns, a shuttle head operative to group such yarns in a flat layer of contiguous yarns having a single yarn thickness, means operative continuously to lay such group in a zigzag manner to form a continuous flat layer of contiguous yarns having a single yarn thickness, a moving conveyor on which such yarns are laid, said conveyor comprising outwardly projecting pins at each side thereof operative to engage such yarns layers as such yarn is laid thereacross, support means for said shuttle head extending transversely of said conveyor, means operative to move said shuttle head back and forth along said support means thus to lay such layer of yarns, means operative to secure such yarns together in such continuous flat layer, and means on each side of such conveyor operating a synchronism with said shuttle head operative to engage yarns from said shuttle head and pull the same into engagement with the pin conveyor anchoring such yarns at each side of said conveyor.

11. A mop making machine as set forth in claim 10 wherein said means at each side of said conveyor to pull said yarns into engagement therewith comprises a picker pin, means operative to move said picker pin in a rectilinear path in timed relation with the movement of said shuttle head to pull such yarns therefrom into engagement with the adjacent pins projecting from said conveyor.

12. A mop making machine as set forth in claim 10 including means operative to index said support means for said shuttle head after such layer of yarns has been drawn into engagement with said conveyor at each side thereof.

13. A mop making machine as set forth in claim 12 including a shuttle head operating arm, and means operative to oscillate said arm thus to move said shuttle head back and forth along said support means.

14. A mop making machine as set forth in claim 13 including an operating pivot on said arm, a cylindrical cam driving said operating pivot operative to oscillate said arm, an adjustable pivot on said arm spaced from said shuttle head further than said operating pivot operative to control the stroke of said arm and thus said shuttle head, and means operative to vary the width of said conveyor to vary the width of the continuous flat layer of contiguous yarns produced.

15. A mop making machine comprising a source of a plurality of mop yarns, a shuttle head operative to group such yarns in a flat layer of contiguous yarns having a single yarn thickness, means operative continuously to lay such group in a zigzag manner to form a continuous flat layer of contiguous yarns having a single yarn thickness, a moving conveyor on which such yarns are laid, said conveyor comprising outwardly projecting pins at each side thereof operative to engage such yarn layers as such yarn is laid thereacross, means operative to secure such yarns together in such continuous flat layer, support means for said shuttle head extending transversely of said conveyor, means operative to move said shuttle head back and forth along said support means, said shuttle head being provided with a plurality of staggered apertures, each aperture receiving a pair of such yarns and parallel grooved roller means spaced from said apertures, said yarns passing through said apertures and between said roller means.

16. A mop making machine comprising a source of a plurality of mop yarns, means operative to group such yarns in a flat layer of contiguous yarns having a single yarn thickness, means operative continuously to lay such group in a zigzag manner to form a continuous flat layer of contiguous yarns having a single yarn thickness, means operative to secure such yarns together in such continuous flat layer, means operative to control the tension of each individual yarn, and means responsive to a broken or snagged yarn operative to halt operation of the machine.

17. A mop making machine as set forth in claim 16 wherein said means operative to control the tension of each yarn comprises a drag brake unit through which the individual mop yarns pass, said drag brake unit comprising a guide pulley and an associated spring loaded brake.

18. A mop machine as set forth in claim 16 including guide pulleys for each of said mop yarns, means mounting said guide pulleys on the ends of actuating arms, means operative resiliently to hold said arms in a balanced condition, and means responsive to the movement of said arms a predetermined degree in either direction to halt operation of the machine.

19. A mop making machine comprising a source of a plurality of mop yarns, means operative to group such yarns in a flat layer of contiguous yarns having a single yarn thickness comprising a shuttle head having apertures therein adapted to receive pairs of such yarns, a moving support parallel to such layer, means operative to move said shuttle head back and forth across said moving support, the arrangement of apertures in such shuttle head being operative to group such yarns in such layer, means operative to anchor such layer on both sides of said moving support, means operative to secure such yarns together in such contiguous flat layer, and including a tape spool adjacent said conveyor operative to feed tape to the yarns thereon to be sewn to such yarns, a pivotally mounted arm operative to engage the tape within said spool, and means responsive to the pivotal movement of said yarn in one direction operative to detect a nearly empty tape spool.

20. A mop making machine as set forth in claim 19 including means responsive to the pivotal movement of said arm in the opposite direction to prevent operation of the machine.

References Cited by the Examiner

UNITED STATES PATENTS

| | | | |
|---|---|---|---|
| 1,209,639 | 12/1916 | Carter | 300—21 |
| 2,242,444 | 5/1941 | Altenbern et al. | 300—21 |
| 2,351,546 | 6/1944 | Rogers | 300—21 X |
| 2,449,668 | 9/1948 | Peterson | 300—21 |
| 2,707,297 | 5/1955 | Woodling | 300—21 |
| 3,107,124 | 10/1963 | Barr | 300—21 |

GRANVILLE Y. CUSTER, Jr., *Primary Examiner.*